INVENTOR
ROLAND B. CALDWELL

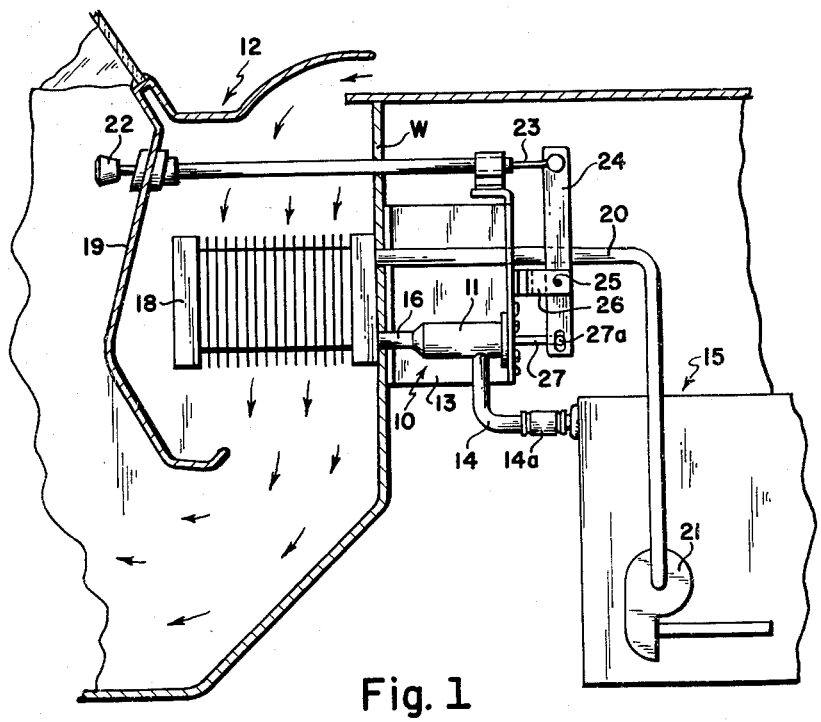
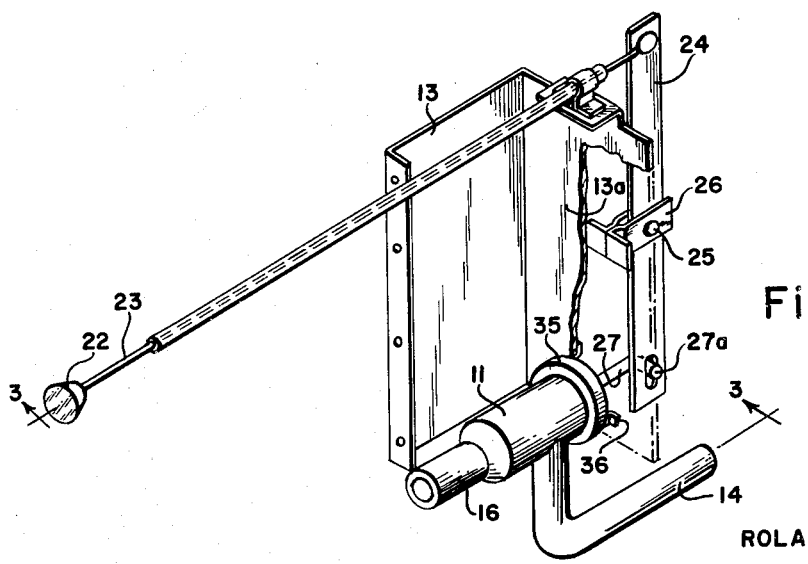
Fig. 1
Fig. 2
INVENTOR
ROLAND B. CALDWELL
BY *Roy E Raney*
ATTORNEY

INVENTOR
ROLAND B. CALDWELL

BY *Roy E. Raney*

ATTORNEY

United States Patent Office 3,212,524
Patented Oct. 19, 1965

3,212,524
CONTROL VALVE FOR AUTOMOBILE
HEATERS AND THE LIKE
Roland B. Caldwell, Worthington, Ohio, assignor to Ranco Incorporated, Columbus, Ohio, a corporation of Ohio
Filed Sept. 24, 1962, Ser. No. 225,439
1 Claim. (Cl. 137—625.3)

This invention relates to fluid control valves, and more particularly to an improved manually operated valve for regulating the flow of a heat exchange liquid through a heat exchanger, such as those used in systems for heating the air within the passenger compartments of automotive vehicles.

Manually operated control valves have been used heretofore to regulate the rate of flow of hot liquid coolant from automobile engines or the like through a radiator or heat exchanger disposed in the passenger compartment thereof so that the temperature within the compartment can be increased or decreased by increasing and decreasing the flow of coolant through the radiator. Because the amount of heat required in the passenger compartment varies considerably in accordance with prevailing weather conditions, the number of persons in the car, and the like, it is desirable to provide a regulating valve having a wide range of flow control, including a closed position, and including a control member which can be easily manipulated by the user to attain the flow desired. Because of the initial pressures and pressure differentials experienced in modern automobile cooling systems, it has been difficult to attain close control over the coolant flow with the presently known valves.

Accordingly, it is a primary object of this invention to provide an improved flow control valve for automobile heaters, and the like, which affords a fine degree of control over a wide range of flow conditions from off to full flow.

It is another object of this invention to provide a manually operated control valve of the foregoing character which minimizes the effects of internal pressures and pressure differentials within a closed cooling system on the regulating ability of the valve.

Another important object of this invention is to provide an automotive heater system control valve operable by a manually positionable control member which is movable between fully closed and fully open valve positions with the amount of valve opening changing at a decreasing rate as the control member is moved toward the fully closed valve position so that a "spreading" of the range of control is effected under the more critical reduced flow conditions, thereby allowing a fine degree of heating adjustment to be made with a nicety not possible heretofore.

As another object this invention aims to provide a manually operated control device which achieves the aforementioned objects through the use of a slide valve member extending through a cooperating sleeve disposed between inlet and outlet ports of the valve body, and comprising elongated flow passages which are progressively exposed to fluid flow as the valve member is moved from one flow position to another.

Still another object of this invention is the provision of a flow control valve wherein a hollow cylindrical slide valve member is arranged for cooperating axial movement with respect to an encircling sleeve to provide progressive valving action, and which slide valve member is relatively unaffected by forces of liquid flow therethrough and therefore may be effectively balanced by a constant area diaphragm means.

Other objects and advantages of this invention will become apparent from the following detailed description of a presently preferred embodiment thereof read in conjunction with the accompanying sheets of drawings forming a part of this specification, and in which FIG. 1 is a schematic, fragmentary view in section of a portion of a passenger automobile having a heating system with which a valve device embodying this invention is associated;

FIG. 2 is an enlarged perspective view of the control valve device of this invention with a portion of the mounting bracket thereof broken away;

Figure 3:
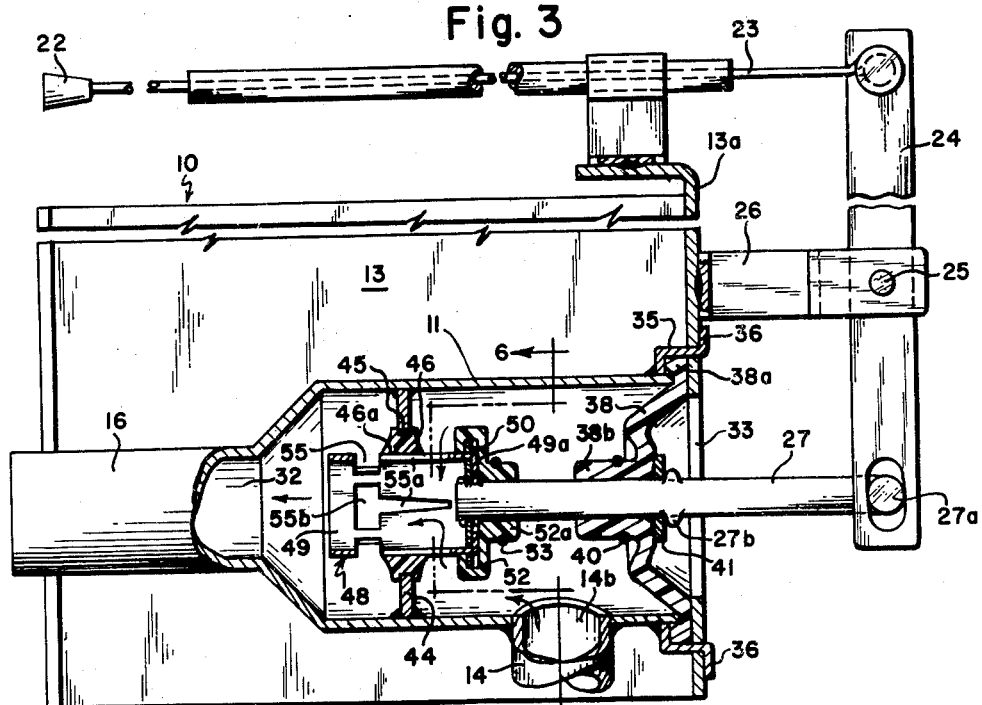
FIG. 3 is an enlarged longitudinal sectional view of the valve device of FIG. 2 taken along lines 3—3 thereof.

In the form of the invention illustrated in the drawings and described hereinafter, there is provided a manually operated flow control device or valve 10 which is shown in FIG. 1 in association with a heating system of a passenger automobile 12. The valve 10 comprises a tubular valve body 11 supported by a channel shaped bracket 13 which is suitably secured to the fire wall W of the vehicle. The valve body 11 is provided with an inlet pipe 14 connected by a suitable hose 14a to the water jacket of the automobile engine 15. An outlet tube 16 extends from the valve body 11 through the fire wall W and is connected to the inlet of a heat exchanger or radiator 18 mounted on the passenger compartment side of the fire wall W behind a dash panel 19. The heat exchanger 18 has an outlet connected by a suitable hose 20 to the inlet side of a coolant circulating pump 21 forming part of the cooling system of the automobile engine.

The flow of liquid through valve 10 is controlled by a manually operable knob 22 mounted on the dash panel 19 and secured to one end of a Bowden wire 23, the opposite end of which is connected to the upper end of a valve actuating lever 24. The lever 24 is pivoted at 25 on a pivot member 26 extending from the bracket 13, and its lower end is engaged by the hooked end 27a of a valve stem 27 extending from the valve body 11.

Referring now more particularly to FIG. 3, in which the valve parts are shown in an intermediate flow position, the valve body 11 comprises a frustoconical wall 31 merging with the outlet tube 16 at one end to define an outlet opening 32, and is secured at its other end in registration with an opening 33 formed in a flange 13a of the bracket 13. The body 11 is secured to the flange 13a by a mounting ring 35 which is brazed to the valve body, as shown, and comprises a plurality of tabs 36 which extend through suitable openings in the flange 13a and are crimped over against the flange. A flexible wall or closure member 38, formed of rubber or the like, is tightly clamped near its outer edge between the annular edge of the valve body 11 and the surface of flange 13a surrounding opening 33, and by a peripheral bead 38a confined within the mounting ring 35. The wall 38 has a central boss 38b surrounding the valve stem 27 and held in fluid-tight relation thereto by a spring clip 40. A washer 41 is disposed against the outer surface of wall 38 and the shaft 27 is staked as at 27b to provide an abutment for the washer 41 and boss 38b of the flexible wall for a purpose which will become apparent as the description proceeds.

Disposed between the inlet opening 14b, provided by inlet line 14, and the outlet opening 32 there is provided an annular wall 44 secured to the inner surface of the valve body 11 by brazing or the like. The wall 44 defines a central opening 45 in which is secured a resilient plastic sleeve 46 which is axially aligned with the valve stem 27. The end portions of the sleeve 46 are tapered or contoured to provide somewhat flexible flanges 46a surrounding the bore thereof.

A hollow, cylindrical slide valve member 48 is slidably disposed within the sleeve 46 and it preferably comprises a tubular element 49 secured at one end thereof by bent over lugs 49a to a disc 50 which is mounted on the valve stem between staked projections as shown. A rubber seal 52 embraces the disc 50, the end of tubular element 49, and the valve stem 27 to provide a fluid-tight closed end of the valve member 48 adjacent the inlet passage 14a. The rubber seal 52 preferably has a boss 52a encircling the valve stem 27 and held in sealing relation thereto by a spring ring 53. The tubular element 49 of the valve member 48 is provided with a plurality of circumferentially spaced ports or openings 55 having axially tapered portions 55a leading into relatively large rectangular portions 55b.

When the valve device is in the position shown in FIG. 3, a path of water flow may be traced from the inlet opening 14a into the interior of valve body 11, through the portions of tapered ports 55a exposed to the right of the sleeve 46, through the hollow valve member 48, and out the outlet opening 32a. In this position a relatively small quantity of water or other coolant is passed by the ports 55a to the outlet opening and heat exchanger 18 connected thereto. Because of the action of the pump 21, the pressure to the left of valve member 48 is substantially less than the pressure in the valve to the right of the valve member and this pressure differential tends to move the valve member from the right to the left with a force corresponding to the effective area of the end of the valve member as a piston. This force is effectively counter-balanced by pressures within the valve body acting to the right on the flexible wall 38 secured to the valve stem 27 and bearing against the washer 41. It will be noted that because the water flows radially through the side walls of tubular element 48, radial forces on the valve member due to such flow will be cancelled out and net forces acting axially of the valve member 48 will be independent of the axial position of the valve member and of the rate of flow. Accordingly, there is no increase of forces acting axially on the valve member when moved toward a partially closed condition as is the case with poppet type valves. Radial forces do, however, serve to press the flexible flanges 46a of sleeve 46 into fluid tight engagement with the valve member 48.

Figure 4:
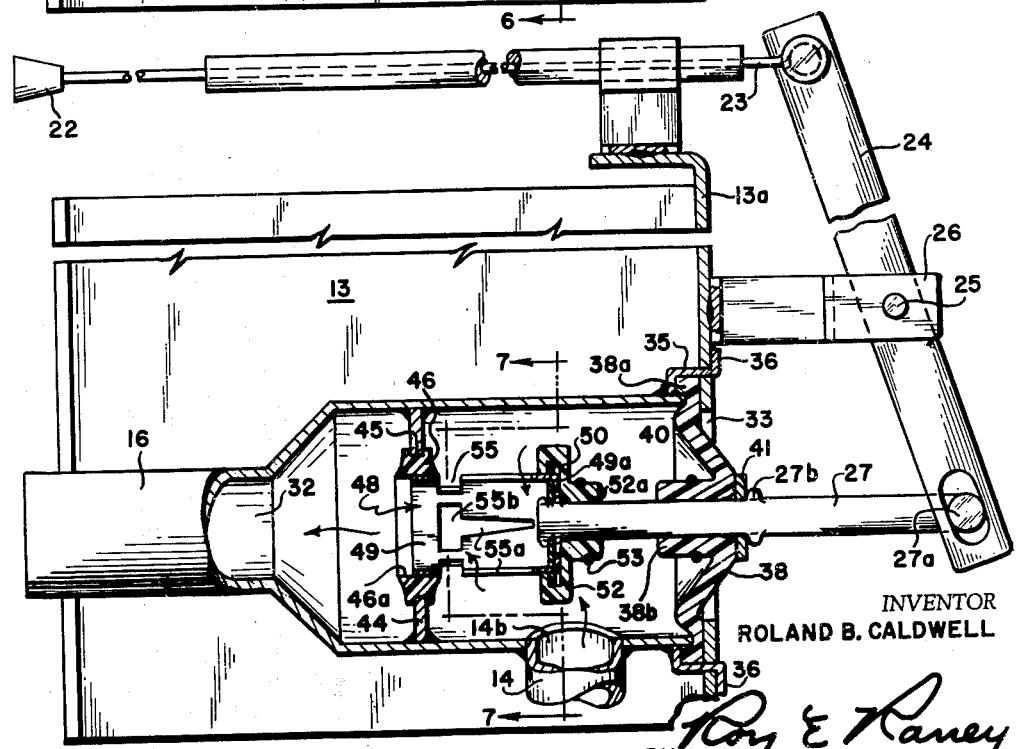
FIG. 4 is a view similar to FIG. 3 but showing parts thereof in different operating positions.
Figure 5:
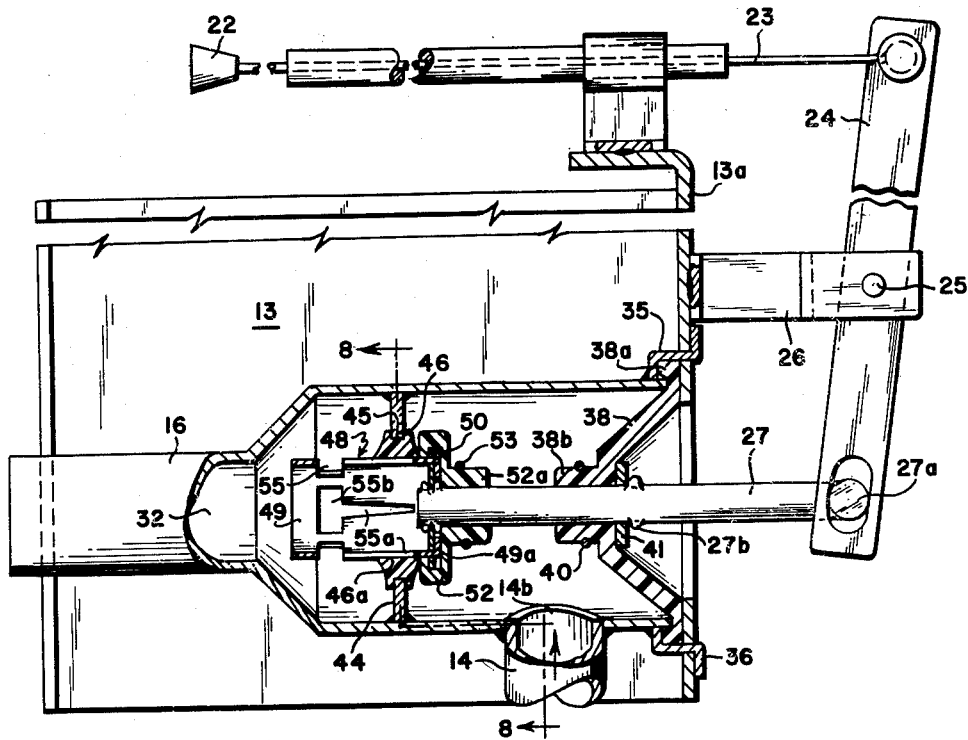
FIG. 5 is another view similar to FIG. 3 but showing the parts in still other operating positions.
Figure 6:
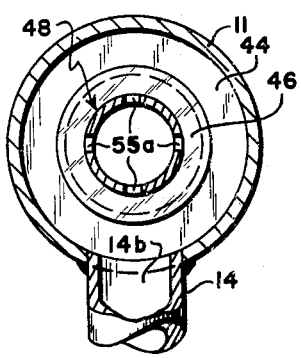
FIG. 6 is a fragmentary sectional view taken along line 6—6 of FIG. 3.
Figure 7:
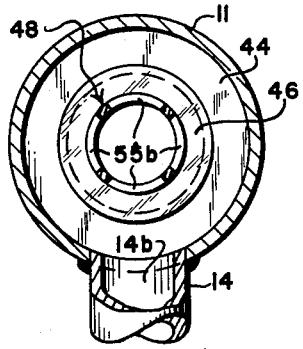
FIG. 7 is a fragmentary sectional view taken along line 7—7 of FIG. 4.
Figure 8:
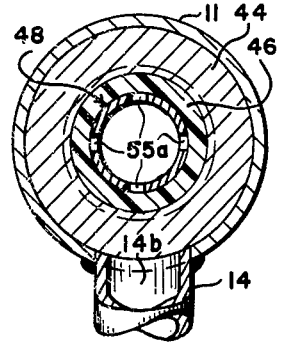
FIG. 8 is a fragmentary sectional view taken along line 8—8 of FIG. 5.

The valve member 48 may be moved to the right or left through the agency of the control knob 22, Bowden wire 23, and lever 24 to increase or decrease the rate of flow to the heat exchanger 18, and hence to increase or decrease the temperature in the passenger compartment. FIG. 4 illustrates the fully opened position of the valve in which the larger port portions 55b are exposed to the right of the sleeve 46. Conversely, FIG. 5 illustrates the fully closed position of the device wherein no portion of the ports 55 are exposed to the right of the sleeve. It will be recognized that an infinite number of control positions may be selected between the fully closed and fully open positions, and that because the elongated port portions 55a are tapered to offer progressively lesser changes of opening as the valve device is operated from the full on position of FIG. 4 to the closed position of FIG. 5, there is provided a "spreading" of the positions of control knob 22 for selecting small increments of change in the relatively low flow rate end of the control range. For this reason, the control valve 10 of this invention provides a nicety and finess of control in the more critical minimum flow positions in a simple yet effective manner. As may be seen from FIGS. 3, 4 and 5, the closed end of the valve member 48 and the body 11 define a space therebetween which remains constant irrespective of the reciprocal movement of the valve member.

Although the present invention has been described in considerable detail with reference to a specific control valve embodying the invention, it will be understood that the invention is not limited thereto, but rather the invention includes all those changes, modifications, adaptations and uses as are reasonably embraced by the scope of the claim hereof.

Having thus described my invention, I claim:

An automobile heater control valve comprising:
(a) a tubular hollow body having an outlet opening at one end and an inlet opening adjacent the other end,
(b) an annular wall disposed inside said body between said inlet and outlet openings,
(c) a sleeve of resilient material extending through said annular wall and defining a cylindrical bore, said sleeve having tapered end portions providing relatively flexible flanges surrounding said bore,
(d) a hollow cylindrical valve member reciprocably mounted in the bore of said sleeve and having a closed end facing said inlet opening and an open end facing said outlet opening, said closed end and said hollow body being spaced apart a distance which remains constant irrespective of reciprocal movement of said valve member,
(e) said valve member having an elongated port extending through a side wall thereof,
(f) a valve stem secured to the closed end of said valve member and extending to the exterior of said valve body through the end thereof opposite said outlet opening,
(g) sealing means between said valve body and valve stem, said sealing means permitting axial movement of said valve stem for positioning said valve member with selected areas of said port exposed on the inlet side of said sleeve for regulating fluid flow from said inlet opening to said outlet opening, and
(h) said elongated port comprising a tapered portion and a rectangular portion, said tapered portion having a narrow end adjacent the closed end of the valve member and a wide end merging with said rectangular portion.

References Cited by the Examiner

UNITED STATES PATENTS

| 1,070,741 | 8/13 | Smith | 137—625.38 |
| 3,056,575 | 10/62 | Mooney | 251—172 |
| 3,096,068 | 7/63 | Claridge et al. | 251—282 XR |

FOREIGN PATENTS

| 303,041 | 12/28 | Great Britain. |
| 333,429 | 8/30 | Great Britain. |
| 473,218 | 10/37 | Great Britain. |

M. CARY NELSON, *Primary Examiner.*

MILTON KAUFMAN, *Examiner.*